United States Patent
Singh et al.

(10) Patent No.: US 10,045,259 B2
(45) Date of Patent: Aug. 7, 2018

(54) CALL SETUP TECHNIQUES USING WLAN RADIO AND SHARED CELLULAR RADIO

(71) Applicant: Apple Inc., Cupertino, CA (US)

(72) Inventors: Ajoy K. Singh, Milpitas, CA (US); Prashant H. Vashi, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 97 days.

(21) Appl. No.: 15/143,217

(22) Filed: Apr. 29, 2016

(65) Prior Publication Data

US 2017/0318502 A1    Nov. 2, 2017

(51) Int. Cl.

| | |
|---|---|
| *H04L 1/16* | (2006.01) |
| *H04W 36/00* | (2009.01) |
| *H04W 36/30* | (2009.01) |
| *H04W 76/10* | (2018.01) |
| *H04W 76/30* | (2018.01) |
| *H04W 88/06* | (2009.01) |

(52) U.S. Cl.
CPC ....... *H04W 36/0022* (2013.01); *H04W 36/30* (2013.01); *H04W 76/10* (2018.02); *H04W 76/30* (2018.02); *H04W 88/06* (2013.01)

(58) Field of Classification Search
CPC . H04W 36/0022; H04W 36/30; H04W 76/02; H04W 76/06; H04W 84/12
See application file for complete search history.

(56) References Cited

U.S. PATENT DOCUMENTS

| | | |
|---|---|---|
| 8,605,652 B1 | 12/2013 | Singh et al. |
| 8,824,411 B2 | 9/2014 | Sebeni et al. |
| 9,131,429 B1 | 9/2015 | Bharadwaj et al. |
| 2012/0294173 A1* | 11/2012 | Su .................. H04W 24/10 370/252 |
| 2013/0201850 A1 | 8/2013 | Swaminathan et al. |
| 2013/0267267 A1 | 10/2013 | Mujtaba et al. |
| 2015/0163811 A1 | 6/2015 | Konstantinou et al. |

\* cited by examiner

*Primary Examiner* — Kan Yuen
(74) *Attorney, Agent, or Firm* — Meyertons Hood Kivlin Kowert & Goetzel, P.C.; Jeffrey C. Hood; Michael B. Davis

(57) ABSTRACT

In some embodiments, a cellular baseband processor communicates wirelessly and reports cellular metrics for both a first cellular RAT and a second cellular RAT. The cellular baseband processor may be configured to tune away, for a time interval, from the first cellular RAT to monitor for communications on the second cellular RAT. In some embodiments, the cellular baseband processor is configured not to report cellular metrics during the time interval to prevent a RAT manager from setting up a connection for voice calls on a WLAN RAT during the time interval. In some embodiments another processing element the RAT manager is configured to ignore cellular metrics from the cellular baseband processor during the interval. This may reduce signal load and power consumption, in some embodiments.

20 Claims, 6 Drawing Sheets

CALL SETUP TECHNIQUES USING WLAN RADIO AND SHARED CELLULAR RADIO

FIELD

The present application relates to wireless communications, and more particularly to determining when to set up a non-cellular connection for voice calls in the context of cellular tune away.

DESCRIPTION OF THE RELATED ART

Wireless communication systems are rapidly growing in usage. Additionally, there exist numerous different wireless communication technologies and standards. Some examples of wireless communication technologies include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others.

Wireless technologies are increasingly using packet-switched connections for performing voice and video communication between users, e.g., using VoLTE (Voice over LTE (Long Term Evolution)) or video over LTE. Past technologies typically utilized circuit-switched networks for voice communications and packet-switched networks for data.

Some wireless devices include both a baseband processor for wireless local area network (WLAN) communications (e.g., using Wi-Fi standards) and a baseband processor for cellular communications (e.g., LTE using standards). Some wireless devices share the cellular baseband processor among cellular multiple radio access technologies (RATs). For example, the cellular radio may be shared for orthogonal frequency division multiplexing (OFDM) communications and for code division multiple access (CDMA) communications. A given communication application (e.g., a voice call) may be handed over between the various RATs. Further, connections may be set up even when a call is not occurring (in idle mode) in preparation for initiating a call on different RATs. For example, a connection may be set up using Wi-Fi, but torn down if signal conditions are good on LTE. Generally, avoiding a large number of handovers back and forth in a short time interval or set up and bring down of Wi-Fi connections for voice calls in a short time interval (often referred to as "ping-ponging") may be desirable, especially when one of the RATs is capable of providing sufficient quality of service.

SUMMARY

Embodiments are presented herein of techniques for determining when to set up a non-cellular connection for voice calls in the context of cellular tune away.

In some embodiments, a cellular baseband processor communicates wirelessly and reports cellular metrics for both a first cellular RAT and a second cellular RAT. For example, in some embodiments the first cellular RAT supports high-speed Internet data (e.g., LTE without VoLTE) and the second cellular RAT supports voice communications (e.g., CDMA 1X). In such embodiments, the cellular baseband processor may camp on an LTE cell for data service and may periodically tune away from the LTE cell to CDMA 1X to listen for paging messages for a potential incoming voice call. This may be a common occurrence in roaming situations, for example, where LTE is deployed but voice is only supported over legacy RATs.

In some embodiments, a RAT manager executed on another processor is configured to determine whether to maintain a connection over a wireless local area network (WLAN) RAT for voice calls. In order to make Wi-Fi voice calls, for example, the device may have to be registered using the IP multimedia subsystem (IMS) over Wi-Fi. Therefore, when the RAT manager decides to use Wi-Fi calling, it may need to set up a WLAN tunnel and initiate IMS registration and it may similarly bring down the connection when Wi-Fi calling is not used.

When the cellular baseband processing is tuning away to the second RAT, cellular metrics may indicate "no signal" initially and then may reflect quality for the second RAT rather than the first RAT, until the end of the tune away interval. In some embodiments, in response to determining that the baseband processing element is tuning away from the first cellular RAT to the second cellular RAT, for a time interval, to monitor for communications on the second cellular RAT, the RAT manager is configured not to use the quality metrics from the cellular baseband processing element to determine whether to set up or bring down the connection over the WLAN RAT (e.g., by triggering establishment of a WLAN tunnel and registration with an IMS server) during the time interval. In some embodiments, the cellular baseband processor is configured not to report cellular metrics during the time interval.

In some embodiments, disclosed techniques may prevent establishment of WLAN context for voice calls on the WLAN RAT based on conditions for the second cellular RAT or transient conditions during tune away. This may reduce power consumption and signal load, in some embodiments.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

Figure 1:
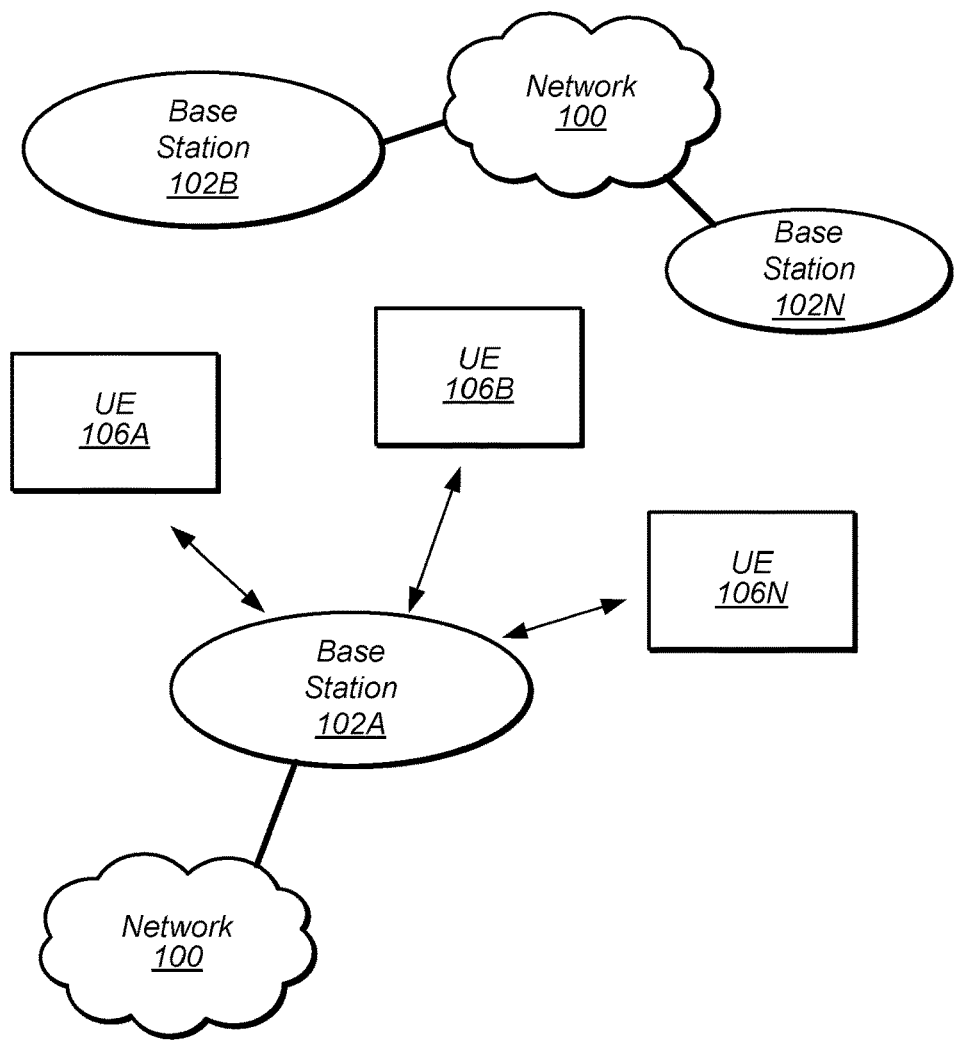
FIG. 1 illustrates an exemplary (and simplified) wireless communication system, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

DETAILED DESCRIPTION

Acronyms

The following acronyms may be used in the present disclosure.
3GPP: Third Generation Partnership Project
3GPP2: Third Generation Partnership Project 2
APN: Access Point Name
BLER: Block Error Rate (same as Packet Error Rate)
BER: Bit Error Rate
CRC: Cyclic Redundancy Check
DL: Downlink
GBR: Guaranteed Bit Rate
GSM: Global System for Mobile Communications
IMS: IP Multimedia Subsystem
IP: Internet Protocol
LTE: Long Term Evolution
MME: Mobility Management Entity
MO: Message Originating
MT: Message Terminating
NAS: Non-access Stratum
PCC: Policy and Charging Control
PCEF: Policy and Charging Enforcement Function
PCRF: Policy and Charging Rules Function
PCSCF: Proxy Call Session Control Function
PGW: Packet Gateway
PER: Packet Error Rate
QCI: Quality of Service Class Index
QoS: Quality of Service
RRC: Radio Resource Control
SGW: Serving Gateway
SINR: Signal to Interference-and-Noise Ratio
SIR: Signal to Interference Ratio
SNR: Signal to Noise Ratio
Tx: Transmission
UE: User Equipment
UL: Uplink
UMTS: Universal Mobile Telecommunication System
VoLTE: Voice Over LTE Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., a smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless cellular telephone system or cellular radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually," where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
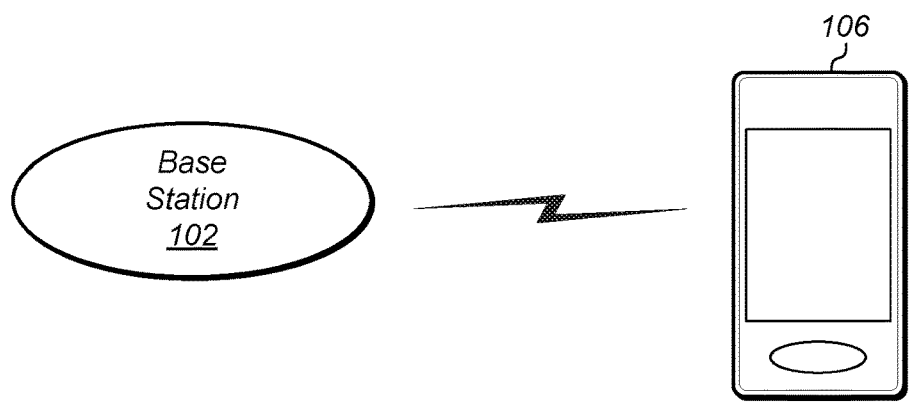
FIG. 2 illustrates a base station (BS) in communication with a user equipment (UE) device, according to some embodiments.

FIGS. 1 and 2—Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A-106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices (UEs) and/or between the UEs and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), HSPA, 3GPP2 CDMA2000 (e.g., 1xRTT, 1xEV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-160N and similar devices over a wide geographic area via one or more cellular communication standards. In contrast, "non-cellular" radio access technologies do not hand over between base stations when travelling between cells.

Thus, while base station 102A may act as a "serving cell" for UEs 106A-160N as illustrated in FIG. 1, each UE 106 may also possibly come within communication range of, and be capable of receiving signals from, one or more other cells (which might be provided by base stations 102B-N and/or any other base stations), which may be referred to as "neighboring cells." Such cells may also be capable of facilitating communication between user devices and/or between user devices and the network 100, according to the same wireless communication technology as base station 102A and/or any of various other possible wireless communication technologies. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 may be configured to communicate using a wireless networking (e.g., Wi-Fi) and/or peer-to-peer wireless communication protocol (e.g., BT, Wi-Fi peer-to-peer, etc.) in addition to at least one cellular communication protocol (e.g., GSM, UMTS (WCDMA, TD-SCDMA), LTE, LTE-A, HSPA, 3GPP2 CDMA2000 (e.g., 1xRTT, 1xEV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A-106N) in communication with a base station 102 (e.g., one of the base stations 102A-102N), according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. Alternatively, or in addition, the UE 106 may include one or more integrated circuits configured to perform any of the method embodiments described herein.

The UE 106 may include one or more antennas for communicating using one or more wireless communication protocols or technologies. In some embodiments, the UE 106 is configured to communicate using either of CDMA2000 (1xRTT/1xEV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate (and possibly multiple) transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1xRTT (or LTE or GSM), and separate radios for communicating using each of Wi-Fi and Bluetooth. Other configurations are also possible.

Figure 3:
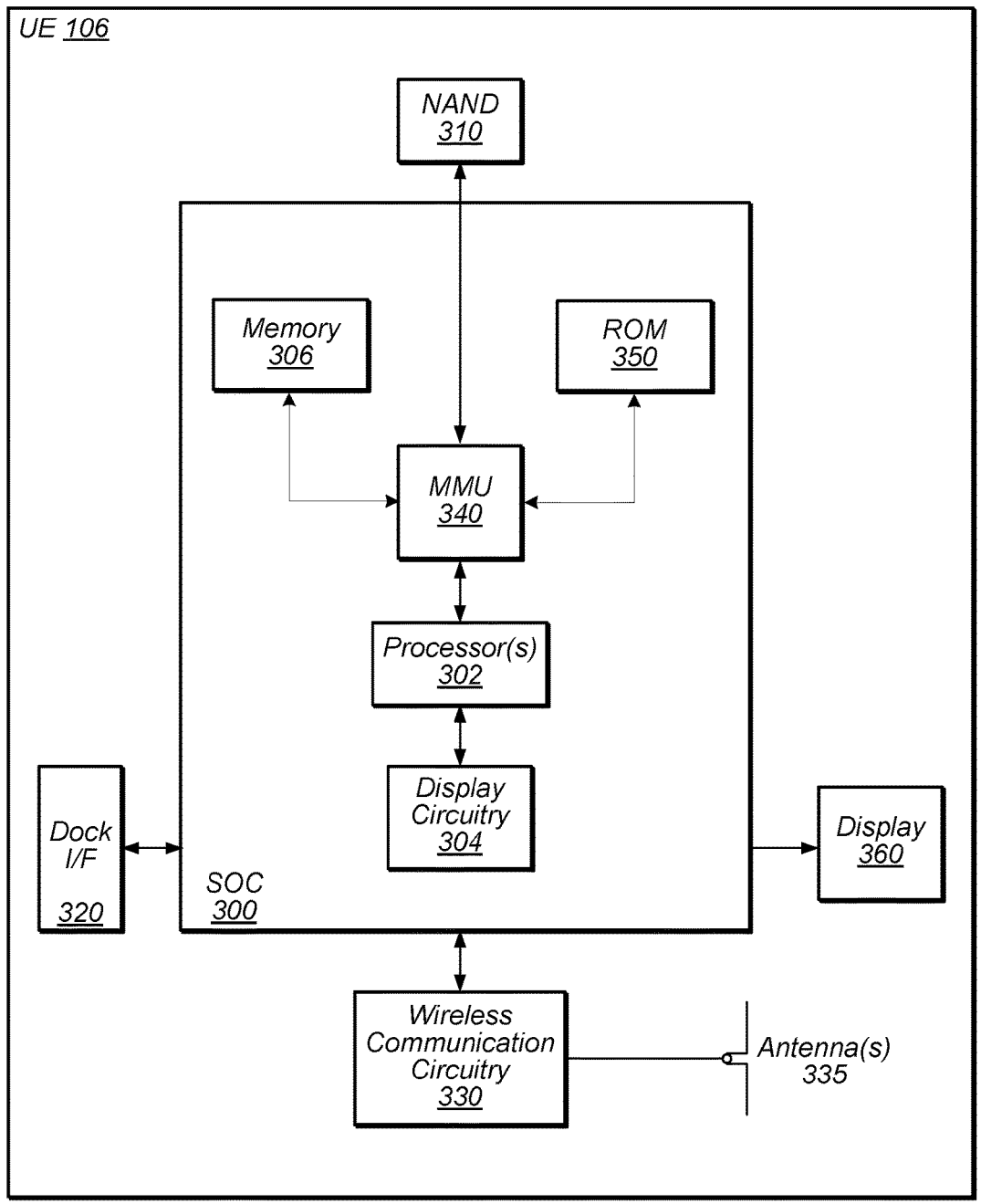
FIG. 3 illustrates an exemplary block diagram of a UE, according to some embodiments.

FIG. 3—Exemplary Block Diagram of a UE

FIG. 3 illustrates an exemplary block diagram of a UE 106, according to some embodiments. As shown, the UE 106 may include a system on chip (SOC) 300, which may include processing elements for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, Wi-Fi, GPS, etc.).

The UE device 106 may include at least one antenna (and possibly multiple antennas, e.g., for MIMO and/or for implementing different wireless communication technologies, among various possibilities), for performing wireless communication with base stations and/or other devices. For example, the UE device 106 may use antenna(s) 335 to perform the wireless communication. As noted above, the UE 106 may be configured to communicate wirelessly using multiple wireless communication technologies in some embodiments.

As described further subsequently herein, the UE 106 may include hardware and software components for implementing features and methods described herein. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition), the processor 302 of the UE device 106, in conjunction with one or more of the other components 300, 304, 306, 310, 320, 330, 335, 340, 350, 360 may be configured to implement part or all of the features described herein.

Figure 4:
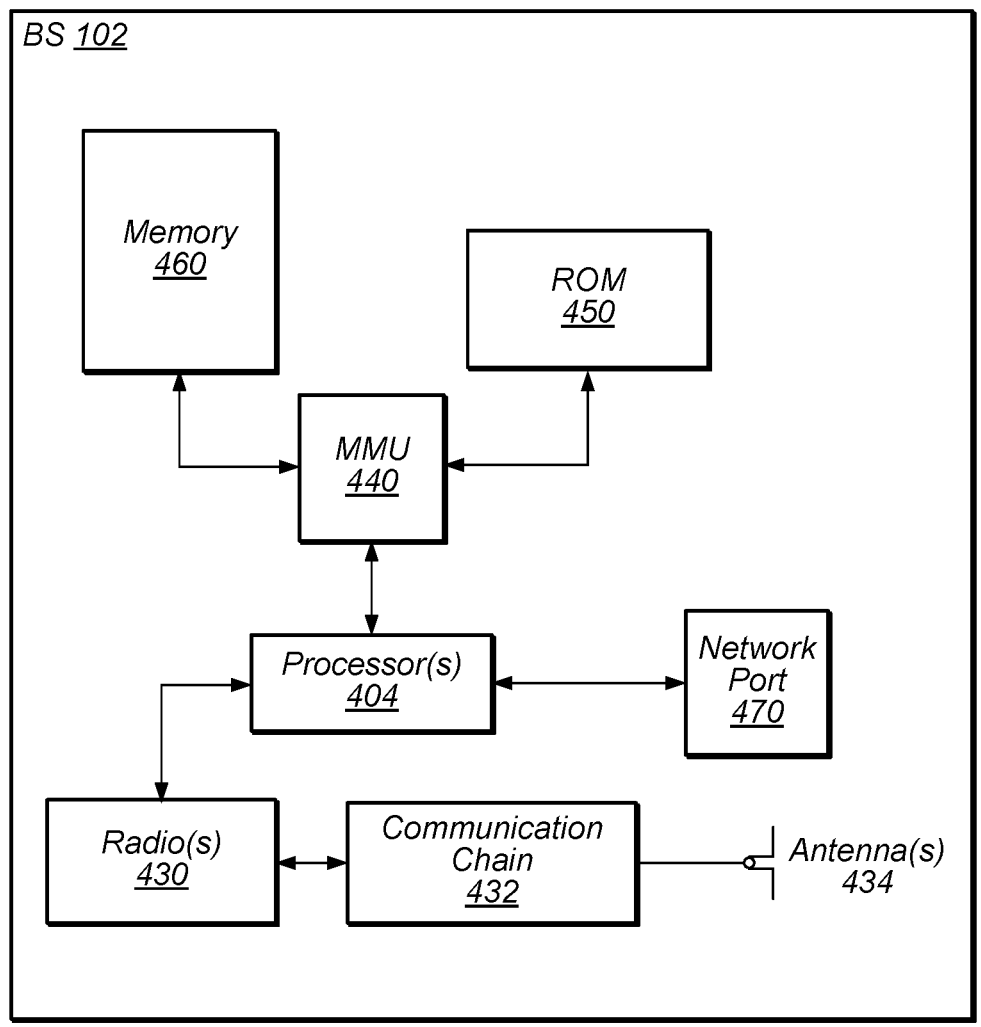
FIG. 4 illustrates an exemplary block diagram of a BS, according to some embodiments.

FIG. 4—Exemplary Block Diagram of a Base Station

FIG. 4 illustrates an exemplary block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi).

The base station 102 may include hardware and software components for implementing or supporting implementation of features described herein. The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition), the processor 404 of the base station 102, in conjunction with one or more of the other components 430, 432, 434, 440, 450, 460, and/or 470, may be configured to implement or support implementation of part or all of the features described herein.

Overview of Exemplary RAT Manager

Figure 5:
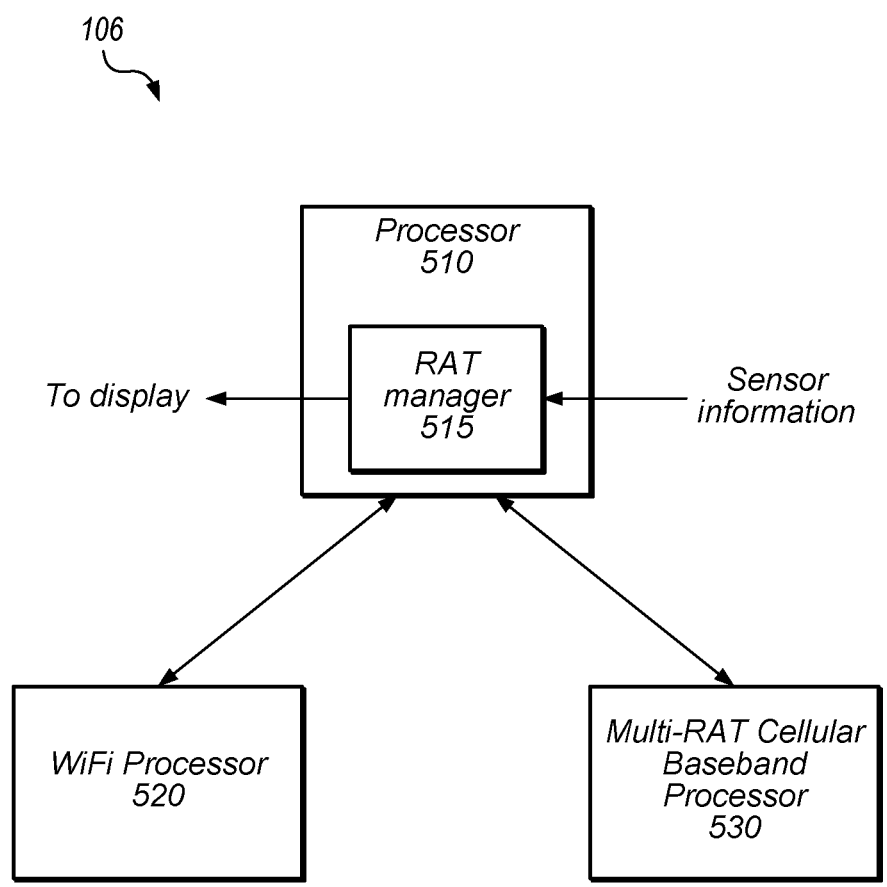
FIG. 5 is a block diagram illustrating exemplary communications between a RAT manager and different WLAN and cellular baseband processing elements, according to some embodiments.

FIG. 5 is a block diagram illustrating a portion of a UE 106 configured to communicate via a WLAN RAT and multiple cellular RATs, according to some embodiments. In the illustrated embodiment, device 160 includes processor 510, Wi-Fi processor 520, and multi-RAT cellular baseband processor 530. In some embodiments, processor 510 corresponds to one of the processor(s) 302 discussed above with reference to FIG. 3. In some embodiments, processors 520 and 530 correspond to all or a portion of wireless communication circuitry 330.

Processor 510 may be a central processing unit (CPU), for example. In other embodiments, processor 510 is a dedicated control processor for wireless communications. In various embodiments, processor 510 is configured to execute program instructions according to a particular instruction set architecture (ISA). Processor 510 may therefore execute various applications for device 500. In the illustrated embodiment, processor 510 is configured to execute a RAT manager application 515, which is discussed in further detail below.

Wi-Fi processor 520, in the illustrated embodiment, is configured to execute a Wi-Fi protocol stack to process Wi-Fi communications. Therefore, Wi-Fi processor may be connected to one or more antennas. In the illustrated embodiment, Wi-Fi processor 520 is configured to receive control signals and wirelessly transmit data received from processor 510 and is configured to provide received wireless data and report Wi-Fi signal conditions to processor 510. Examples of Wi-Fi signal quality metrics include, without limitation: received signal strength indicator (RSSI), signal to noise ratio (SNR), packet error rate (PER), beacon loss, metrics based on multiple measurements, etc.

To make voice calls over Wi-Fi processor 520, RAT manager 515 may be configured to set up a WLAN connection (e.g., by creating a WLAN tunnel for voice calls and registering UE 106 for IMS). RAT manager 515 may be configured to set up the WLAN connection when cellular quality is poor and bring down the WLAN connection when cellular quality is high. Setting up the connection may increase signaling load and power consumption. Therefore, it may be desirable not to set up the connection unless calls really need to proceed over Wi-Fi (e.g., because of poor cellular conditions).

Wi-Fi processor 520 may be configured to enter a low power mode when Wi-Fi signals are not available or when communications are occurring over a cellular RAT. Although Wi-Fi is discussed herein for exemplary purposes, in other embodiments any of various appropriate WLAN standards may be implemented for WLAN communications, including various non-Wi-Fi standards. Further, any of various other non-cellular communications types may be substituted for WLAN herein. WLAN is discussed to facilitate explanation of one RAT that may be associated with ping-ponging with a cellular RAT, but is not intended to limit the scope of the present disclosure.

Cellular baseband processor 530, in the illustrated embodiment, is configured to execute one or more cellular protocol stacks for multiple different RATs. In the illustrated embodiment, cellular baseband processor 530 is configured to receive control signals and wirelessly transmit data received from processor 510 and is configured to provide received wireless data and report cellular signal conditions to processor 510. In some embodiments, circuitry of cellular baseband processor 530 is shared by the different RATs. In some embodiments, the sharing is performed using time duplexing, such that when one of the RATs is being used, the other is unavailable for communications by UE 106 and vice versa. For example, cellular baseband processor 530 may be configured to execute only a single cellular protocol stack at a time. In shared embodiments, various components such as oscillators, antennas, filters, digital to analog converters, etc. may be shared between the multiple RATs.

Cellular baseband processor 530 may report signal conditions based on various parameters or combinations of parameters. Cellular metrics may include, without limitation: signal bars, a no service indication, link quality metrics, indications of single radio voice call continuity (SRVCC) handover, call state, and serving cell type. Particular examples of link quality metrics include, without limitation: reference signal received power (RSRP), SNR, packet data convergence protocol (PDCP) discard counts, radio link control (RLC) packet loss, number of hybrid automatic repeat request (HARD) retries, number of random access channel (RACH) failures. In various embodiments, certain metrics may be determined based on one or more other metrics. For example, the signal bars indicator is typically based on multiple link quality metrics, which may be weighted to provide the signal bar metric.

RAT manager 515, in some embodiments, is configured to control which RAT is used for initiating interactive communication applications such as voice or video calls. In the illustrated embodiment, RAT manager is configured to receive signal quality information from processors 520 and 530 and select an appropriate RAT based on the information. In some embodiments, RAT manager 515 also optionally receives sensor information. For example, the sensor information may indicate the rate and direction of movement for UE 106, which may cause RAT manager 515 to avoid RATs with smaller coverage area when moving, for example. In some embodiments, RAT manager 515 also optionally provides signal quality metrics to a display. For example, many UEs display the "signal bar" indicator to show the user the approximate strength of the wireless connection. In some embodiments, RAT manager 515 also considers real-time protocol (RTP) metrics such as packet loss and nominal jitter buffer delay and/or transport metrics such as transmission control protocol (TCP) setup success, historical usage, and/or round-trip time (RTT).

In some embodiments, RAT manager 515 is configured to use a cellular RAT for interactive communications applications (e.g., voice or video calls) as long as a cellular connections meets quality requirements (e.g., quality of service and/or bit rate) of the application. In some embodiments, if a cellular RAT cannot meet requirements, RAT manager 515 is configured to set up a connection over the WLAN RAT for interactive applications (e.g., in idle mode when a call is not occurring).

In some embodiments, RAT manager is also configured to transfer calls in active mode. Once a communications application is proceeding on the WLAN RAT, RAT manager 515 is configured to keep the application on the WLAN RAT as long as the WLAN signal quality is good, in some embodiments. In other embodiments, RAT manager 515 is configured to move the application to a cellular RAT if cellular quality meets a particular threshold at any point during a call. In various embodiments, RAT manager 515 may weight and process WLAN and cellular metrics using various appropriate techniques to achieve desired call quality, reduce signaling load, reduce switching between RATs, increase revenue, decrease costs, etc. In some embodiments, call mobility is supported for only a portion of the cellular RATs over which UE 106 is configured to operate. For example, in some embodiments calls can be moved from Wi-Fi to LTE and vice versa but not from Wi-Fi to CDMA or vice versa.

Although elements 510, 520, and 530 are shown separately in the illustrated embodiment, these elements may be included on the same integrated circuit in other embodiments. In some embodiments, each element executes separate software and/or firmware. In some embodiments, one or more of the elements are separate integrated circuits and may be manufactured by different entities.

Exemplary Techniques for Handling Cellular Tune-Away

In some embodiments, when connected via one RAT (e.g., an LTE RAT), cellular baseband processor 530 is configured to tune away to monitor for paging messages of another RAT (e.g., a CDMA 1X RAT). During such an exemplary tune away interval, the LTE RAT is unavailable for communications and measured signal conditions be based on the CDMA RAT rather than the LTE RAT. Further, the signal conditions may indicate that there is no cellular signal available when switching between cellular RATs or if a CDMA cell is not available.

Figure 6:
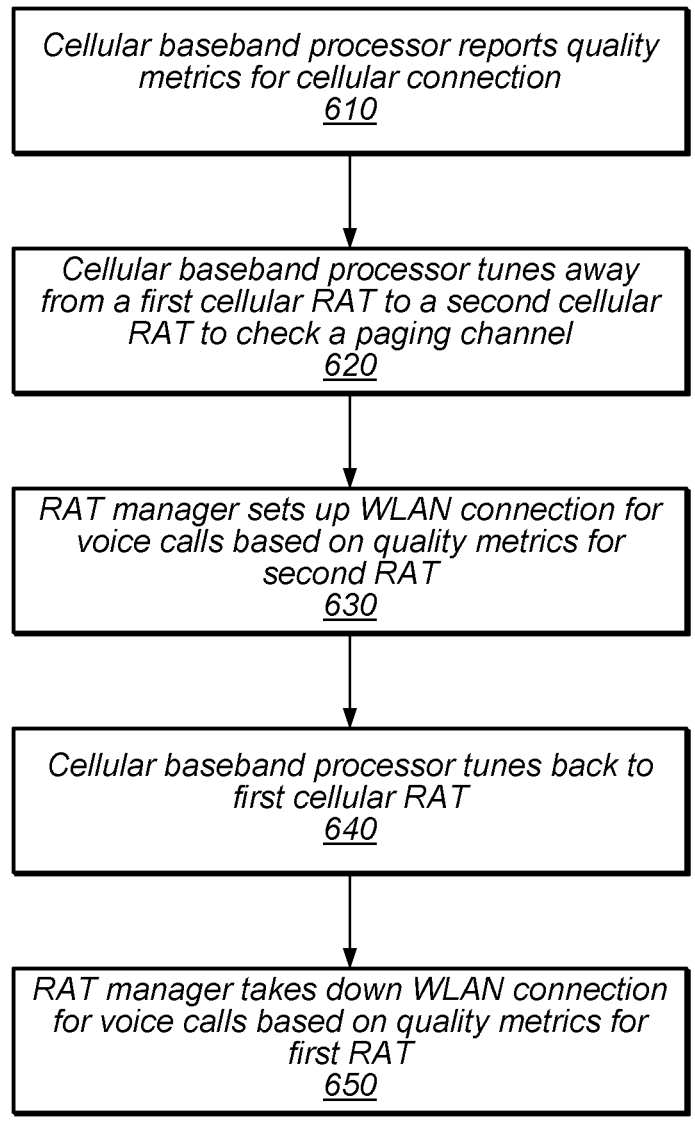
FIG. 6 is a flow diagram illustrating an exemplary implementation that causes ping-ponging.

FIG. 6 shows an exemplary implementation in which the RAT manager uses cellular signal quality information during tune-away, resulting in ping-ponging. At 610, in the illustrated implementation, cellular baseband processor 530 reports quality metrics for cellular connections. This may be performed periodically or aperiodically (e.g., whenever metrics are available for reporting). At 620, cellular baseband processor 530 tunes away from a first cellular RAT to a second cellular RAT to check a paging channel. In the illustrated example, the signal quality on the first cellular RAT is good while the signal quality on the second cellular RAT is poor. Therefore, at 630, RAT manager 515 sets up a WLAN connection for voice calls based on quality metrics for the second RAT. Subsequently, at 640, cellular baseband processor 530 tunes back to the first cellular RAT. Then, at 650, RAT manager 515 brings down the WLAN connection (the connection established at 630) based on the quality metrics (indicating good quality) on the first RAT. In various contexts, it may have been preferable not to set up the WLAN connection in this situation, e.g., because the signal quality was good on cellular and setting up and bringing down the connection increases signal load and power consumption.

Therefore, in some embodiments, UE 106 is configured not to consider cellular quality metrics during tune away. In some embodiments, RAT manager 515 is configured to ignore reported metrics from cellular baseband processor 530 during tune-away. In other embodiments, baseband processor 530 is configured not to report quality metrics during tune away.

Figure 7:
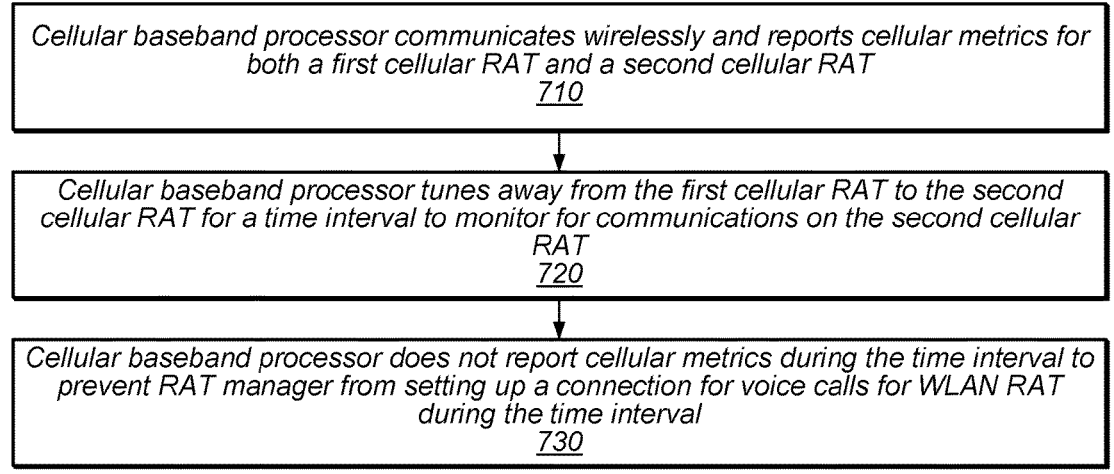
FIG. 7-8 are flow diagrams illustrating an exemplary methods for handling cellular tune away in determining whether to set up a connection for voice calls over WLAN, according to some embodiments.

FIG. 7 is a flow diagram illustrating a method for refraining from reporting cellular quality metrics during tune-away, according to some embodiments. The method shown in FIG. 7 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 710, in the illustrated embodiment, cellular baseband processor 530 is configured to communicate wirelessly and report cellular metrics for both first and second cellular RATs. In some embodiments, the first RAT is a packet-switched RAT (e.g., an LTE RAT) and the second RAT is a circuit-switched RAT. In some embodiments, the cellular baseband processor 530 is shared between the RATs using time multiplexing, such that only one RAT is used for communicating and reporting conditions at a time. In some such embodiments, cellular baseband processor 530 is therefore configured to communicate and report cellular metrics for a single RAT at a time in step 710. In order to switch between RATs, various components of cellular baseband processor may be reconfigured, e.g., to operate at different frequencies or process according to different protocols.

At 720, in the illustrated embodiment, cellular baseband processor 530 tunes away from the first cellular RAT to the second cellular RAT to monitor for communications on the second cellular RAT. For example, processor 530 may tune away to monitor for messages on a paging channel of the second cellular RAT. In embodiments in which cellular baseband processor 530 is shared between the cellular RATs, any quality metrics determined during the tune-away correspond to the second cellular RAT rather than the first cellular RAT. For example, a cell of the second cellular RAT may not be detected and a "no signal" indication may be determined. In other situations, the signal quality on the second cellular RAT may be much worse than the first cellular RAT.

At 730 in the illustrated embodiment, cellular baseband processor 530 is configured not to report cellular metrics during the time interval (in some embodiments during the entire tune-away interval) in order to prevent RAT manager 515 from setting up a connection for voice calls for the WLAN RAT during the time interval. This may avoid set up and bring down of a WLAN connection.

Figure 8:
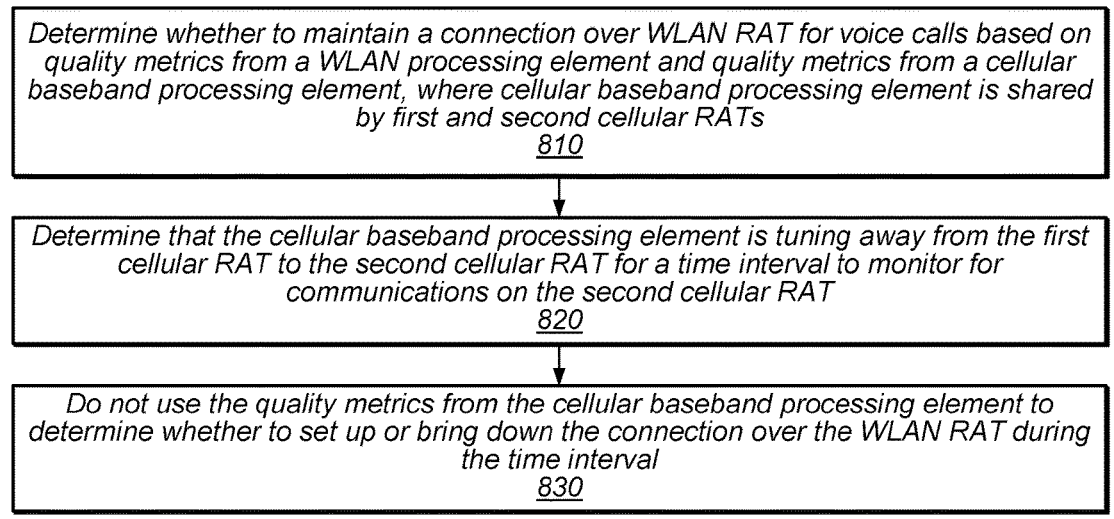

FIG. 8 is a flow diagram illustrating a method for ignoring reported cellular quality metrics during tune-away, according to some embodiments. The method shown in FIG. 8 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 810, in the illustrated embodiment, RAT manager 515 determines whether to maintain a connection over the WLAN RAT for voice calls based on quality metrics from WLAN processor 520 and cellular baseband processor 530. RAT manager 515 may make the decision whether to set up or bring down such a connection periodically or may make this determination each time a new report is received, for example. Setting up the connection may setting up a WLAN tunnel for interactive communication to the carrier's core network and performing IMS registration with the carrier's IMS service over the WLAN tunnel. In the illustrated embodiment, as in the embodiment of FIG. 7, the cellular baseband processor 530 is shared by first and second cellular RATs.

At 820, in the illustrated embodiment, RAT manager 515 determines that cellular baseband processor 530 is tuning away from the first cellular RAT to the second cellular RAT for a time interval. In some embodiments, cellular baseband processor 530 is configured to explicitly notify RAT manager 515 that it is tuning away and/or when it returns from tuning away. In other embodiments, RAT manager 515 is configured to detect the tune away without an explicit indication. For example, there is typically no signal for a brief interval at the beginning of the tune away procedure when switching between cellular RATs. In some embodiments, RAT manager 515 is configured to detect this interval and determine that the cellular baseband processor 530 is tuning away or tuning back.

At 840, in the illustrated embodiment, RAT manager 515 is configured not to use the quality metrics from the cellular baseband processor 530 to determine whether to set up or bring down the connection over the WLAN RAT during the time interval. In some embodiments, this includes ignoring any quality metrics from the cellular baseband processor 530 during the entire tune-away interval. In some embodiments, RAT manager 515 is configured not to set up the connection on the WLAN RAT for the entirety of the time interval (and, in some embodiments, for a period after tuning back to the first cellular RAT). In some embodiments, RAT manager 515 may process the cellular metrics during the tune-away (e.g., by storing the metrics and processing them to determine channel state for the second RAT), but is not configured to use the metrics from the tune-away interval in the decision whether maintain the WLAN connection.

In some embodiments, various techniques discussed above may be combined. For example, the cellular baseband processor 530 may notify RAT manager 515 that it is tuning away but may also be configured to refrain from sending quality metrics during the tune away. Although some of the disclosed embodiments are in the context of an idle mode, similar techniques may be used to determine whether to handover an ongoing interactive communication application between RATs, in other embodiments.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, an apparatus comprises means for performing one or more of the method elements of one or more of FIGS. 6-8.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
a processor configured to:
determine whether to maintain a connection to a cellular carrier's network over a wireless local area network (WLAN) RAT for voice calls based on quality metrics from a WLAN processing element and quality metrics from a cellular baseband processing element, wherein the cellular baseband processing element is shared by a first cellular RAT and a second cellular RAT; and determine that the cellular baseband processing element is tuning away from the first cellular RAT to the second cellular RAT, for a time interval, to monitor for communications on the second cellular RAT;

wherein, based on the determination that the cellular baseband processing element is tuning away, the processor is configured not to use the quality metrics from the cellular baseband processing element to determine whether to set up or bring down the connection over the WLAN RAT during the time interval.

2. The apparatus of claim 1, wherein, to set up the connection over the WLAN RAT, the processor is configured to set up a WLAN tunnel and perform internet protocol multimedia system (IMS) registration with the cellular carrier using the WLAN tunnel.

3. The apparatus of claim 1, wherein the first cellular RAT is a packet-switched RAT and the second cellular RAT is a circuit-switched RAT.

4. The apparatus of claim 1, wherein the apparatus is configured not to set up a connection over the WLAN RAT for voice calls during the time interval.

5. The apparatus of claim 1, further comprising the cellular baseband processing element.

6. The apparatus of claim 1, wherein the quality metrics include at least one of: signal bar information, no service indication, serving cell type, reference signal received power (RSRP), signal to noise ratio (SNR), packet loss, or retransmission retries.

7. The apparatus of claim 1, wherein the processor is configured to determine that the cellular baseband processing element is tuning away based on a no service indication at the beginning of the tune away.

8. The apparatus of claim 1, wherein the processing is configured to determine that the cellular baseband processing element is tuning away based on a message from the cellular baseband processing element indicating the tune away.

9. A non-transitory computer-readable medium having instructions stored thereon that are executable by a computing device to perform operations comprising:

determining whether to maintain a connection to a cellular carrier's network over a non-cellular RAT for voice calls based on quality metrics from a non-cellular processing element and quality metrics from a cellular baseband processing element, wherein the cellular baseband processing element is shared by a first cellular RAT and a second cellular RAT; and determining that the cellular baseband processing element is tuning away from the first cellular RAT to the second cellular RAT, for a time interval, to monitor for communications on the second cellular RAT; and not using the quality metrics from the cellular baseband processing element to determine whether to set up or bring down the connection over the non-cellular RAT during the time interval.

10. The non-transitory computer-readable medium of claim 9, wherein the operations further comprise preventing set-up of the connection on the non-cellular RAT during the entire time interval.

11. The non-transitory computer-readable medium of claim 9, wherein the quality metrics from the cellular baseband processing element include at least one of: signal bar information, no service indication, serving cell type, reference signal received power (RSRP), signal to noise ratio (SNR), packet loss, or retransmission retries.

12. The non-transitory computer-readable medium of claim 9, wherein the operations further comprise determining that the cellular baseband processing element is tuning away based on a no service indication at the beginning of the tune away.

13. The non-transitory computer-readable medium of claim 9, wherein the operations further comprise determining that the cellular baseband processing element is tuning away based on a message from the cellular baseband processing element indicating the tune away.

14. The non-transitory computer-readable medium of claim 9, wherein setting up the connection over the non-cellular RAT includes setting up a WLAN tunnel and performing internet protocol multimedia system (IMS) registration via the WLAN tunnel for the non-cellular RAT.

15. A method, comprising:

determining, by a processor, whether to maintain a connection to a cellular carrier's network over a wireless local area network (WLAN) RAT for voice calls based on quality metrics from a WLAN processing element and quality metrics from a cellular baseband processing element, wherein the cellular baseband processing element is shared by a first cellular RAT and a second cellular RAT; and determining, by the processor, that the cellular baseband processing element is tuning away from the first cellular RAT to the second cellular RAT, for a time interval, to monitor for communications on the second cellular RAT; and refraining, by the processor based on the determining, from using the quality metrics from the cellular baseband processing element to determine whether to set up or bring down the connection over the WLAN RAT during the time interval.

16. The method of claim 15, further comprising:

setting up the connection over the WLAN RAT by setting up a WLAN tunnel and performing internet protocol multimedia system (IMS) registration with the cellular carrier using the WLAN tunnel.

17. The method of claim 15, wherein the first cellular RAT is a packet-switched RAT and the second cellular RAT is a circuit-switched RAT.

18. The method of claim 15, further comprising refraining from setting up a connection over the WLAN RAT for voice calls during the time interval.

19. The method of claim 15, wherein the quality metrics include at least one of:

signal bar information, no service indication, serving cell type, reference signal received power (RSRP), signal to noise ratio (SNR), packet loss, or retransmission retries.

20. The method of claim 15, wherein the determining is based on one or more of a message from the cellular baseband processing element or a no service indication at the beginning of the tune away.

* * * * *